United States Patent
Choi et al.

(10) Patent No.: US 8,537,881 B2
(45) Date of Patent: Sep. 17, 2013

(54) METHOD AND APPARATUS FOR DETECTING OFFSET SIGNAL OF TRANSMISSION LEAKAGE SIGNAL IN RF TRANSCEIVER

(75) Inventors: Heon soo Choi, Gwangmyeong-si (KR); Chang su Choi, Yongin-si (KR); Hyung jun Jeon, Hwaseong-si (KR); Yeong chan Kim, Seoul (KR)

(73) Assignee: Nethom Co., Ltd., Gunpo-si (KR)

( * ) Notice: Subject to any disclaimer, the term of this patent is extended or adjusted under 35 U.S.C. 154(b) by 251 days.

(21) Appl. No.: 13/039,229

(22) Filed: Mar. 2, 2011

(65) Prior Publication Data
US 2011/0216815 A1 Sep. 8, 2011

(30) Foreign Application Priority Data
Mar. 3, 2010 (KR) .................. 10-2010-0018928

(51) Int. Cl.
*H04B 1/38* (2006.01)
(52) U.S. Cl.
USPC ............................ 375/219; 370/278; 455/258
(58) Field of Classification Search
USPC ................. 370/278; 375/219, 298; 455/110, 455/258, 296
See application file for complete search history.

(56) References Cited

U.S. PATENT DOCUMENTS

| 3,696,429 | A | 10/1972 | Tressa |
| 5,675,286 | A * | 10/1997 | Baker et al. .................. 330/129 |
| 2004/0230393 | A1 | 11/2004 | Andersson |
| 2004/0252782 | A1 * | 12/2004 | Demir et al. .................. 375/296 |
| 2007/0194886 | A1 * | 8/2007 | Bang et al. .................. 340/10.1 |
| 2009/0015378 | A1 | 1/2009 | Song et al. |

FOREIGN PATENT DOCUMENTS

| CN | 1649334 | 8/2005 |
| EP | 1059735 | 12/2000 |
| JP | 2000-124964 | 4/2000 |
| JP | 2009081719 | 4/2009 |
| WO | 2006111724 | 10/2006 |

OTHER PUBLICATIONS

The State Intellectual Property Office of the People's Republic of China Application Serial No. 201110052716.2, Office Action dated Apr. 3, 2013, 6 pages.

* cited by examiner

*Primary Examiner* — Leon-Viet Nguyen
(74) *Attorney, Agent, or Firm* — Lee, Hong, Degerman, Kang & Waimey

(57) ABSTRACT

Disclosed is an RF transceiver in which transmission and reception are simultaneously performed, wherein a magnitude of a transmission leakage signal mixed into a receiving signal is measured, the maximum and minimum scopes on I/Q vector phase-plane in which an offset vector exists is set using the measured magnitude of the transmission leakage signal, the offset vector offsetting the transmission leakage signal as much as possible, a detection area in which the offset vector exists is determined in the set scope, and the offset vector is detected.

10 Claims, 3 Drawing Sheets

METHOD AND APPARATUS FOR DETECTING OFFSET SIGNAL OF TRANSMISSION LEAKAGE SIGNAL IN RF TRANSCEIVER

Pursuant to 35 U.S.C. §119 (a), this application claims the benefit of earlier filing date and right of priority to Korean Patent Application No. 10-2010-0018928, filed on Mar. 3, 2010, the contents of which are hereby incorporated by reference in their entirety.

BACKGROUND OF THE DISCLOSURE

1. Field of the Invention

The present disclosure relates to a method and for detecting an offset signal of a transmission leakage signal in an RF transceiver configured to detect the offset signal in order to offset the transmission leakage signal mixed into a receiving signal that is received in the RF transceiver, and an apparatus thereof.

2. Description of the Related Art

Generally, an RF (Radio Frequency) transceiver needs a separation device to separate a transmitting signal from a receiving signal, since RF transmission and reception are simultaneously generated in the RF transceiver. For example, an RFID (Radio Frequency Identification) reader uses a circulator or a directional coupler to separate a transmitting signal from a receiving signal.

Further, since there is a possibility that some of the transmitting signals leak to be mixed into the receiving signal while the transmitting signal is transmitted and the receiving signal is received through an antenna in the RF transceiver, there is a need to offset such a transmission leakage signal.

An RF transceiver in the prior art couples an offset signal that has the same magnitude as that of the transmission leakage signal and an opposite phase thereto in order to offset the leakage signal so that the transmission leakage signal included in the receiving signal can be offset. Therefore, it is important to find an offset signal corresponding to a transmission leakage signal that has the same amplitude and opposite phase.

Then, since it is difficult to precisely detect and track amplitude and phase of an offset signal in the prior art, an optimum offset vector is commonly detected in a scheme where an entire area on I/Q vector phase-plane is sequentially scanned.

However, there was a problem in that detect on of an offset vector by scanning an entire area of I/Q vector phase-plane took much time depending on resolution. Further, while a resolution should be enhanced in order to increase on offset level of the transmission leakage signal with precise offset vector detection, the operation becomes a factor to increase detection time exponentially.

SUMMARY OF THE INVENTION

The present disclosure relates to a method for detecting an offset signal of a transmission leakage signal to detect an offset signal used to offset the transmission leakage signal in an RF transceiver, and a method thereof.

The present disclosure sets the maximum and minimum scopes on an I/Q vector phase-plane in which an offset vector exists using the measured magnitude of the transmission leakage signal, the offset vector being capable of cancelling the transmission leakage signal as much as possible, determines a detection area in which the offset vector exists and detects the offset vector in the determined detection area.

The present disclosure provides a method for detecting an offset signal of a transmission leakage signal in an RF transceiver configured to detect the offset signal corresponding to the transmission leakage signal in an RF transceiver rapidly and precisely, and a method thereof.

According to one aspect of the present disclosure, a method for detecting an offset signal of a transmission leakage signal in an RF transceiver includes enabling an RF transceiver used to simultaneously transmit and receive an RF signal to measure a magnitude of a transmission leakage signal mixed into a receiving signal, setting the maximum and minimum scopes on I/Q vector phase-plane in which an offset vector exists using the measured magnitude of the transmission leakage signal, the offset vector offsetting the transmission leakage signal as much as possible, and determining a detection area in which the offset vector exists and detecting the offset vector in the determined detection area.

In an embodiment of the present disclosure, the detection area in which the offset vector exists is one of a plurality of areas divided with the origin as the reference point on the I/Q vector phase-plane.

In an embodiment of the present disclosure, the step of setting the maximum and minimum scopes in which an offset vector exists includes setting a first circle whose size is smaller than the magnitude of the transmission leakage signal on the I/Q vector phase-plane in the minimum scope in consideration of a negative (−) measurement error for the magnitude of the measured transmission leakage signal, and setting a second circle whose size is greater than the magnitude of the transmission leakage signal in the maximum scope in consideration of a positive (+) measurement error.

In an embodiment of the present disclosure, wherein the step of determining the detection area in which the offset vector exists includes dividing the area set between the maximum and minimum scopes into a plurality of areas with the origin as the reference point on the I/Q vector phase-plane and determining a sample point in each divided area, detecting a vector for the determined sample point in each area, and determining an area in which the offset vector exists using the detected vector for the sample point in each area.

In an embodiment of the present disclosure, the steps of dividing, detecting and determining are sequentially repeated at least once.

In an embodiment of the present disclosure, the sample point in each area is a middle point of each divided area.

In an embodiment of the present disclosure, the step of determining includes coupling a signal having the same amplitude and phase as those of the detected vector for the sample point in each area, with a receiving signal into which the transmission leakage signal is mixed, detecting a vector having amplitude and phase of a signal that has the largest offset level for the transmission leakage signal after the coupling, and determining an area in which the offset vector exists using an area in which the detected vector exists.

According to another aspect of the present disclosure, an apparatus for detecting an offset signal of a transmission leakage signal in an RF transceiver, the apparatus includes a leakage signal detector for detecting amplitude information of a transmission leakage signal that is mixed into a receiving signal, a controller for determining an offset vector using the amplitude information of the transmission leakage signal detected by the leakage signal detector and controlling a generation of the offset signal to offset the transmission leakage signal, and a leakage signal offset unit for generating the offset signal according to a control of the controller, outputting the offset signal generated and cancelling the transmission leakage signal mixed into the receiving signal, wherein the controller sets the maximum and minimum scopes within which the transmission leakage signal exists on I/Q vector phase-plane according to the amplitude information of the transmission leakage signal detected by the leakage signal detector, divides an area between the maximum and minimum scopes that have been set into a plurality of areas with the origin as the reference point on the I/Q vector phase-plane, determines a sample point for each divided area, detects a vector for each sample point, determines an area in which the offset vector exists using the detected vector for the sample point in each area, and detects an offset vector at the determined area.

In an embodiment of the present disclosure, the controller repeats an operation of dividing an area between the maximum and minimum scopes that have been set into a plurality of areas with the origin as the reference point on the I/Q vector phase-plane, determining a sample point for each divided area, detecting a vector for each sample point in each area, and determining an area in which an offset vector exists using a vector for each sample point detected, once or more times, thereby detecting the offset vector at the determined area.

In an embodiment of the present disclosure, the determination of the area in which the offset vector exists performed by the controller includes coupling a signal having the same amplitude and phase as those of the detected vector for a sample point in each area, with a receiving signal into which the transmission leakage signal is mixed, determining a vector having amplitude and phase of a signal that has the highest offset level of the transmission leakage signal after the coupling, and determining an area in which the offset vector exists from an area in which the determined vector exists.

BRIEF DESCRIPTION OF THE DRAWINGS

The accompanying drawings, which are included to provide a further understanding of the disclosure and are incorporated in and constitute a part of this application, illustrate embodiments of the disclosure and together with the description, serve to explain the principle of the disclosure. In the drawings.

DETAILED DESCRIPTION OF THE PREFERRED EMBODIMENTS

Figure 1:
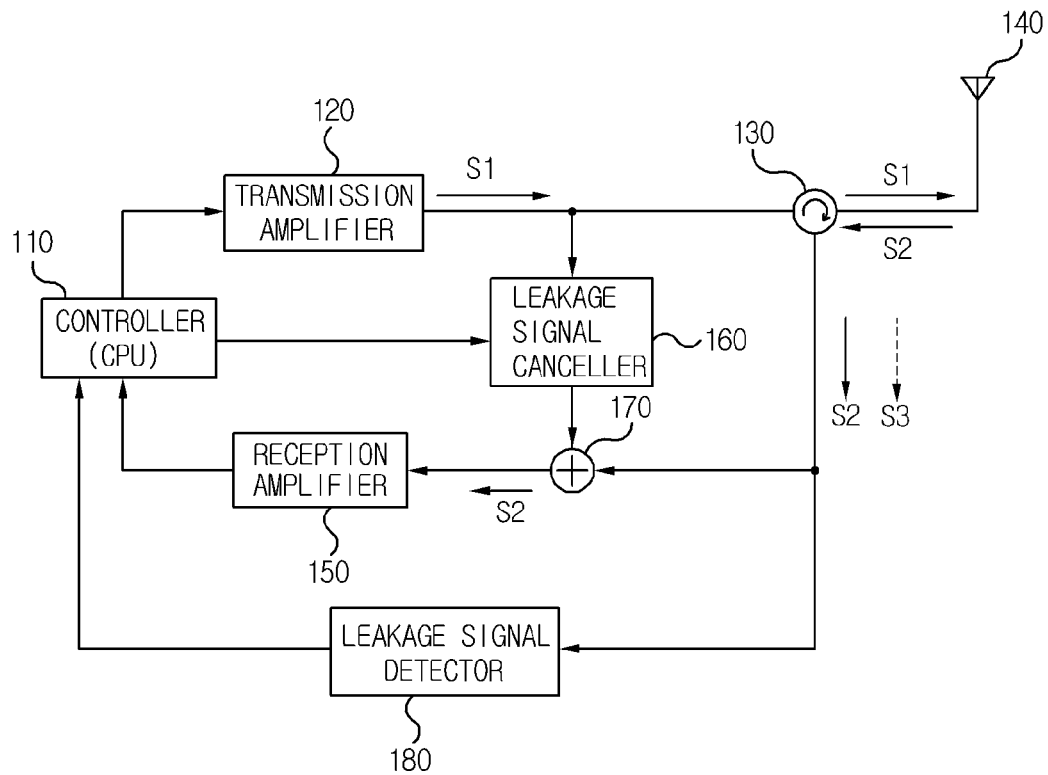
FIG. 1 is a block diagram illustrating a schematic construction of an RF transceiver to which an apparatus for detecting an offset signal of a transmission leakage signal according to the present disclosure.

Hereinafter, embodiments of the present disclosure will be described with reference to the accompanying drawings. In this procedure, size and shape of the components shown in the drawings may be exaggerated for the sake of clarity and convenience. Further, terms that are specifically defined in consideration of construction and operation of the present disclosure may be changed according to operator's intention or custom. Definition of such items should be made on the basis of entire contents of the specification.

FIG. 1 is a block diagram illustrating a schematic construction of an RF transceiver to which an apparatus for detecting an offset signal of a transmission leakage signal according to the present disclosure. Referring to FIG. 1, a transmission signal S1 generated in a controller (CPU) 110 of the RF transceiver according to the present disclosure is amplified in a transmission amplifier 120 and transmitted through an antenna 140 by way of a circulator 130. Further, a receiving signal S2 received through the antenna 140 is amplified in a reception amplifier 150 by way of the circulator 130 and then inputted into the controller (CPU) 110.

At this time, when the transmission signal S1 is transmitted to the antenna 140 by way of the circulator 130 as illustrated in the drawing, some of the transmission signal S1 is leaked to a reception stage, and a transmission leakage signal S3 is mixed into the receiving signal S2.

In order to offset such the transmission leakage signal S3 from the receiving signal S2, some of the transmission signal S1 is shunt and transferred to a leakage signal offset unit 160 in order to cancel the transmission leakage signal S3 from the receiving signal S2. Subsequently, the leakage signal offset unit 160 generates an offset signal that has the same amplitude as the transmission leakage signal and a phase opposite to the transmission leakage signal using the shunt signal and transmits it to a mixer 170.

The mixer 170 mixes the offset signal corresponding to the transmission leakage signal into the receiving signal S2 to which the transmission leakage signal S3 is mixed to cancel the transmission leakage signal S3 and transmits only a pure receiving signal S2 to the reception amplifier 150.

A leakage signal detector 180 detects the transmission leakage signal S3 that exists in the receiving signal S2 and transmits magnitude information detected to the controller (CPU) 110. In more detail, the leakage signal detector 180 detects the magnitude of the transmission leakage signal S3 included in the receiving signal S2 in the state that the leakage signal offset unit 160 does not operate initially. Further, the leakage signal detector 180 transmits the magnitude information of the detected transmission leakage signal S3 to the controller 110.

The controller 110 controllably determines an offset vector that can cancel the transmission leakage signal S3 as much as possible using magnitude information of the transmission leakage signal S3 detected by the leakage signal detector 180 and enables the leakage signal offset unit 160 to generate the offset signal.

The leakage signal offset unit 160 generates the offset signal that has the same amplitude as the transmission leakage signal and a phase opposite to the transmission leakage signal according to a control of the controller 110 and outputs it.

The present disclosure provides a method where the controller 110 detects the offset vector at a higher speed and precisely. For this, it is important to detect amplitude and phase of the offset signal that has the most offset effect for the transmission leakage signal.

Hereinafter, a method and apparatus for detecting an offset signal of the transmission leakage signal in an RF transceiver according to the present disclosure will be described in detail.

FIGS. 2a to 2d illustrate I/Q vector phase-planes used to explain operations of a method and apparatus for detecting an offset signal of a transmission leakage signal in an RF transceiver according to the present disclosure.

Referring to FIGS. 2a to 2d, the leakage signal detector 180 measures a magnitude of the transmission leakage signal S3 that is leaked into the receiving signal S2 in the state that the leakage signal offset unit 160 does not operate. At this time, the measured magnitude of the transmission leakage signal is an absolute magnitude. The magnitude of the transmission leakage signal can be measured using an RF detector such as PIN diodes, for example.

Subsequently, the leakage signal offset unit 160 detects an offset signal using information on a magnitude of the detected transmission leakage signal S3 from the signal some of which is shunt from the transmission signal and inputted to the receiving signal. At this time, it is possible to identify the absolute magnitude of the transmission leakage signal as described above but it is not possible to identify its phase. Accordingly, when the transmission leakage signal 210 is expressed on the I/Q vector phase-plane, it is located in a point on a circumference 200 corresponding to the absolute magnitude on the I/Q vector phase-plane as illustrated in FIG. 2.

Therefore, the offset signal that has the same amplitude as the transmission leakage signal 210 and the phase opposite to the signal 210 is located in a point on the circumference 200 formed as described above.

Figure 2A:
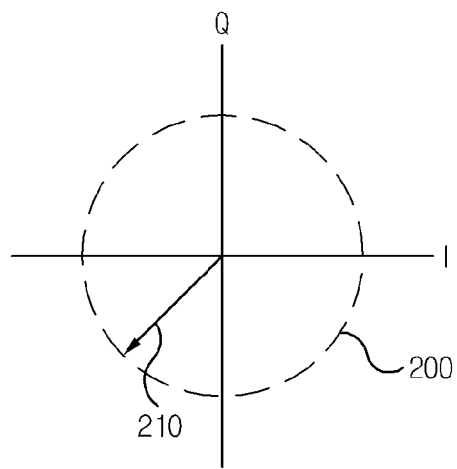
FIGS. 2a to 2d are I/Q vector phase-planes used to explain operations of a method and apparatus for detecting an offset signal of a transmission leakage signal in an RF transceiver according to the present disclosure.
Figure 2B:
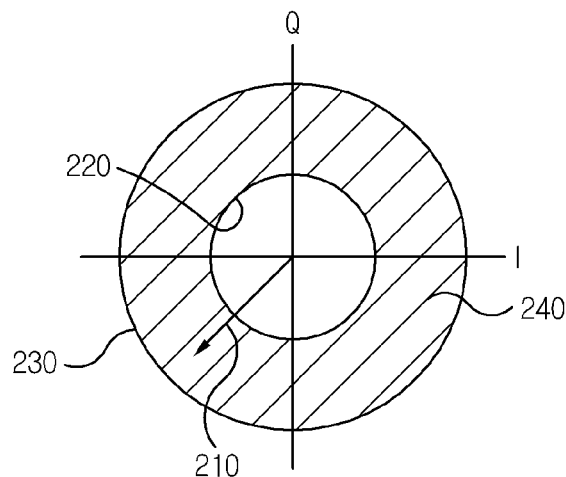

However, since a measurement error of positive/negative (+/−) may be generated when measuring a magnitude of the transmission leakage signal 210 as illustrated in FIG. 2b, it is desirable to set the maximum and minimum scopes for the detection area.

In other words, a first circle 220 whose magnitude is smaller than that of the transmission leakage signal 210 is set in the minimum scope in consideration of a negative (−) measurement error that is set in advance with respect to the magnitude of the transmission leakage signal 210. Further, a second circle 230 whose magnitude is greater than that of the transmission leakage signal 210 is set in the maximum scope in consideration of a positive (+) measurement error that is set in advance with respect to the magnitude of the transmission leakage signal 210. Here, the first and second circles are formed with the origin as the reference on the I/Q vector phase-plane. Accordingly, a detection area 240 of the offset signal lies between the first and second circles 220 and 230.

Since the detection area 240 of the offset signal lies between the first and second circles 220 and 230, there is an effect that detecting time is remarkably reduced compared with a conventional method of detecting an entire area.

Figure 2C:
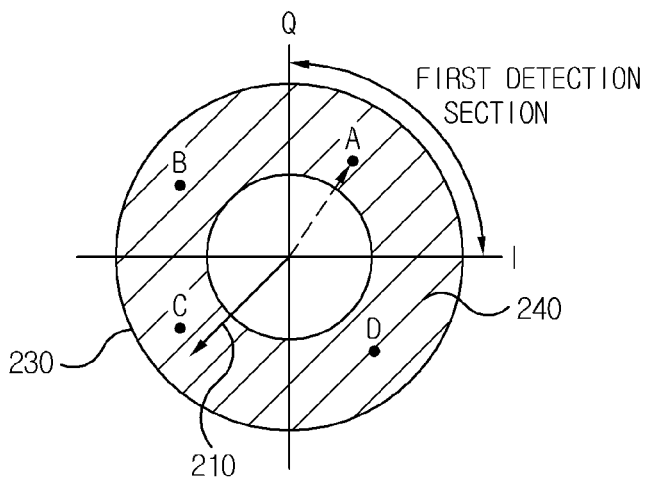

Subsequently, the detection area 240 of the offset signal is divided into a plurality of areas as illustrated in FIG. 2c. FIG. 2c illustrates an example in which the detection area is divided into 4 quarters. Further, a sample point (A, B, C or D) is determined in each divided area. It is preferable that a middle point of each area is determined as a sample point.

Further, a vector for the sample point is sequentially detected in each area. At this time, the vector means a vector pointing to each sample point with the original as the reference. FIG. 2c illustrates a figure to sequentially detect a vector for a sample point starting from the first quarter when it is assumed that the first quarter is a first detection area, for example.

The present disclosure determines an area in which the offset vector exists using a vector for the sample point in each area as described above. For this, a signal that has the same amplitude and phase as those of the detected vector for the sample point in each area is coupled with the receiving signal into which the transmission leakage signal 210 is mixed in the RF transceiver. Further, a vector that has the greatest offset level is determined and then the area in which the vector exists is determined as an area in which the offset vector exists.

Like an example illustrated in FIG. 2c, when the transmission leakage signal 210 exists in the third quarter, the vector offset level in the A sample point will be greater than the vector of other sample points (B-D).

Figure 2D:
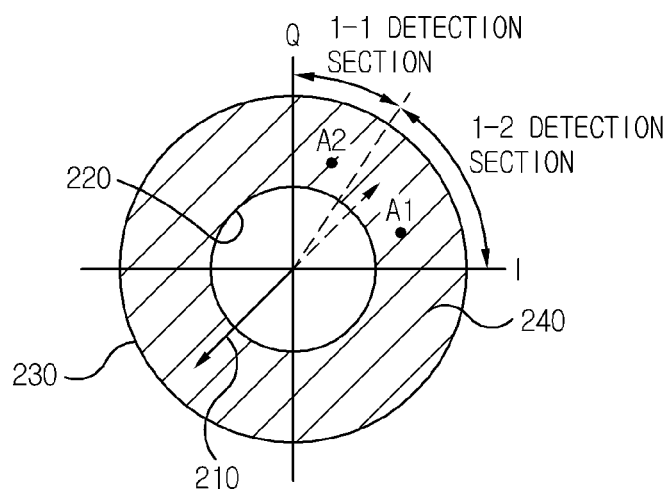

As such, when an area in which the offset vector exists (the first quarter) is determined, the area (the first quarter) is divided into a plurality of sub-areas as illustrated in FIG. 2d. FIG. 2d illustrates an embodiment in which the first quarter is divided into 2 sub-areas (the 1-1 detection section and 1-2 detection section). However, the first quarter may be divided into more sub-areas in other embodiment.

In the sub-areas divided as described above, a sample point (A1,A2) is determined in each sub-area, and a vector in each sample point (A1,A2) is detected as described above. Further, a vector whose offset level is greatest using the detected vector and the area in which the determined vector exists is set as a second detection scope.

The optimum offset vector is finally obtained by repeatedly performing the processes described above.

According to the present disclosure, a detection area is primarily narrowed to between the first and second circles 220 and 230 by passing through processes described above and is secondarily narrowed to sub-areas, and is more narrowed by repeating the above processes at least once.

Accordingly, it is possible to remarkably reduce time used to detect the offset signal.

Recently, an RF communication technology such as RFID (Radio Frequency Identification) and NFC (Near Field Communication) is widely used in various industrial fields. Since signal transmission and receptions are simultaneously generated in such an RF communication technology, there is occurred a phenomenon in which some of the transmission signal is leaked and included into the receiving signal. For this, there is much interest in a technology with which a level of separation between the transmission and reception stages is enhanced.

In view of this aspect, the present disclosure may contribute to an enhancement of signal reception sensitivity by the offset signal sued to cancel the transmission leakage signal included in the receiving signal at a high speed and precisely. Accordingly, the present disclosure may be aptly applied to an RF communication technology and an RF transceiver.

Hereinbefore, while the embodiments of the present disclosure are described, they are exemplary ones only and one of ordinary skill in the art may recognize that various alterations and modifications that fall within the scope of the present disclosure may be possible. Accordingly, the true technical protection scope of the present disclosure should be defined by the following claims.

What is claimed is:

1. A method for detecting an offset signal of a transmission leakage signal in an RF transceiver, the method comprising:

measuring, by the RF transceiver that is used to simultaneously transmit and receive an RF signal, a magnitude of a transmission leakage signal mixed into the received RF signal;

setting maximum and minimum scopes on an I/Q vector phase-plane in which an offset vector exists by using the measured magnitude of the transmission leakage signal, the offset vector offsetting the transmission leakage signal; and determining a detection area in which the offset vector exists and detecting the offset vector in the determined detection area, wherein setting the maximum and minimum scopes comprises:

setting a first circle whose size is smaller than the measured magnitude of the transmission leakage signal on the I/Q vector phase-plane in the minimum scope, and setting a second circle whose size is greater than the measured magnitude of the transmission leakage signal in the maximum scope.

2. The method according to claim 1, wherein the detection area in which the offset vector exists includes one of a plurality of areas divided with the measured magnitude of the transmission leakage signal as a reference point on the I/Q vector phase-plane.

3. The method according to claim 1, wherein the first circle is determined in consideration of a negative measurement error for the measured magnitude of the transmission leakage signal and the second circle is determined in consideration of a positive measurement error for the measured magnitude of the transmission leakage signal.

4. The method according to claim 1, wherein determining the detection area in which the offset vector exists comprises:
dividing an area set between the maximum and minimum scopes into a plurality of areas with the measured magnitude of the transmission leakage signal as the reference point on the I/Q vector phase-plane and determining a sample point in each of the plurality of areas;
detecting a vector for the determined sample point in each of the plurality of areas; and
determining an area in which the offset vector exists using the detected vector for the sample point in each of the plurality of areas.

5. The method according to claim 4, wherein the dividing, detecting and determining are sequentially repeated at least once.

6. The method according to claim 4, wherein the sample point in each of the plurality of areas is a middle point of each of the plurality of areas.

7. The method according to claim 4, wherein determining the detection area in which the offset vector exists comprises:
coupling a signal having a same amplitude and phase as the magnitude and phase of the detected vector for the sample point in each of the plurality of areas, with the received RF signal into which the transmission leakage signal is mixed;
detecting a vector having amplitude and phase of a signal that has a largest offset level for the transmission leakage signal after the coupling; and
determining the detection area in which the offset vector exists by using an area in which the detected vector exists.

8. An apparatus for detecting an offset signal of a transmission leakage signal in an RF transceiver, the apparatus comprising:
a leakage signal detector for detecting amplitude information of a transmission leakage signal that is mixed into a received signal;
a controller for determining an offset vector using the amplitude information of the transmission leakage signal detected by the leakage signal detector and controlling a generation of the offset signal to offset the transmission leakage signal; and
a leakage signal offset unit for generating the offset signal according to a control of the controller, outputting the generated offset signal and cancelling the transmission leakage signal mixed into the received signal,
wherein the controller is configured to:
set maximum and minimum scopes within which the transmission leakage signal exists on I/Q vector phase-plane according to the amplitude information of the transmission leakage signal detected by the leakage signal detector,
divide an area between the set maximum and minimum scopes into a plurality of areas with the measured magnitude of the transmission leakage signal as a reference point on the I/Q vector phase-plane,
determine a sample point for each divided area,
detect a vector for each sample point,
determine an area in which the offset vector exists using the detected vector for the sample point in each of the plurality of areas, and
detect an offset vector at the determined area.

9. The apparatus according to claim 8, wherein the controller is further configured to:
repeat the setting of the maximum and minimum scopes, the dividing of the area between the maximum and minimum scopes, the determining of the sample point, the detecting of the vector for each sample point, and the determining of the area in which the offset vector exists, in order to detect the offset vector at the determined area.

10. The apparatus according to claim 8, wherein the controller detects the offset vector at the determined area by:
coupling a signal having a same amplitude and phase as the magnitude and phase of the detected vector for a sample point in each of the plurality of areas, with the received signal into which the transmission leakage signal is mixed;
determining a vector having amplitude and phase of a signal that has a highest offset level of the transmission leakage signal after the coupling; and
determining the area in which the offset vector exists from an area in which the determined vector exists.

* * * * *